US012785234B2

(12) United States Patent
Watanabe et al.

(10) Patent No.: US 12,785,234 B2
(45) Date of Patent: Nov. 3, 2026

(54) BATTERY HAVING AN EXTERIOR CONTAINER WITH AN INJECTION HOLE FOR ELECTROLYTE SOLUTION, AND A SEALING MEMBER SEALING THE INJECTION HOLE

(71) Applicant: Prime Planet Energy & Solutions, Inc., Tokyo (JP)

(72) Inventors: Kensuke Watanabe, Himeji (JP); Taiki Nonaka, Kakogawa (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 818 days.

(21) Appl. No.: 17/857,140

(22) Filed: Jul. 4, 2022

(65) Prior Publication Data

US 2023/0006292 A1 Jan. 5, 2023

(30) Foreign Application Priority Data

Jul. 5, 2021 (JP) ................................ 2021-111650

(51) Int. Cl.
*H01M 50/645* (2021.01)
*H01M 50/627* (2021.01)
*H01M 50/636* (2021.01)

(52) U.S. Cl.
CPC ....... *H01M 50/645* (2021.01); *H01M 50/627* (2021.01); *H01M 50/636* (2021.01)

(58) Field of Classification Search
None
See application file for complete search history.

(56) References Cited

U.S. PATENT DOCUMENTS

2008/0160393 A1 7/2008 Kim et al.
2010/0304214 A1 12/2010 Itoh et al.
2014/0004411 A1 1/2014 Yokoyama et al.
2015/0194651 A1 7/2015 Urano et al.
2015/0236336 A1 8/2015 Hirakawa et al.
2015/0325833 A1* 11/2015 Harayama ........... H01M 50/645 429/185

FOREIGN PATENT DOCUMENTS

CN 104769749 A 7/2015
JP 2010277936 A 12/2010
JP 201411074 A 1/2014
JP 2015122211 A 7/2015
JP 2017091721 A 5/2017
JP 2020087781 A 6/2020
KR 10-2013-0134948 A 12/2013
WO 2014033822 A1 3/2014
WO 2019/203450 A1 10/2019

* cited by examiner

*Primary Examiner* — Jonathan G Leong
*Assistant Examiner* — Tony S Chuo
(74) *Attorney, Agent, or Firm* — HAUPTMAN HAM, LLP

(57) ABSTRACT

In a state in which a sealing member is fixed to an exterior container by swaging, at least a tip side of a protrusion is embedded in a seal component. In a state before the sealing member is fixed to the exterior container by swaging, when the protrusion of the sealing member and the seal component are brought into abutment with each other, a communication path is formed in the protrusion or the seal component to communicate a space inside the exterior container and a space outside the exterior container with each other.

4 Claims, 10 Drawing Sheets

BATTERY HAVING AN EXTERIOR CONTAINER WITH AN INJECTION HOLE FOR ELECTROLYTE SOLUTION, AND A SEALING MEMBER SEALING THE INJECTION HOLE

This nonprovisional application is based on Japanese Patent Application No. 2021-111650 filed on Jul. 5, 2021, with the Japan Patent Office, the entire contents of which are hereby incorporated by reference.

BACKGROUND OF THE INVENTION

Field of the Invention

The present technology relates to a battery.

Description of the Background Art

Conventionally, a structure has been employed in which an electrolyte solution is injected into an exterior container of a battery and then an electrolyte solution injection hole is sealed by a sealing member. Such a structure is described in, for example, Japanese Patent Laying-Open No. 2010-277936, Japanese Patent Laying-Open No. 2014-11074, and WO2014/033822.

In some cases such as the structure described in Japanese Patent Laying-Open No. 2010-277936, the sealing member is fixed to the exterior container by swaging, whereas in other cases such as each of the structures described in Japanese Patent Laying-Open No. 2014-11074 and WO2014/033822, the sealing member is fixed to the exterior container by welding.

SUMMARY OF THE INVENTION

In the case where the sealing member is fixed to the exterior container by swaging, it is required to avoid occurrence of insufficient swaging in order to secure the sealing of the exterior container. It is an object of the present technology to provide a battery in which occurrence of insufficient swaging is suppressed.

A battery according to the present technology includes: an electrode assembly and an electrolyte solution; an exterior container that accommodates the electrode assembly and the electrolyte solution and that is provided with an injection hole for the electrolyte solution; a sealing member that is fixed to the exterior container by swaging and that seals the injection hole; and a seal component that has an annular shape and that is located between the exterior container and the sealing member. The sealing member includes a stem portion inserted into the injection hole, a flange portion that is located outside the exterior container and that is located on an outer side with respect to the stem portion in a radial direction of the stem portion, and a protrusion that has a substantially annular shape and that protrudes from the flange portion to the exterior container side. In a state in which the sealing member is fixed to the exterior container by swaging, at least a tip side of the protrusion is embedded in the seal component. In a state before the sealing member is fixed to the exterior container by swaging, when the protrusion of the sealing member and the seal component are brought into abutment with each other, a communication path is formed in the protrusion or the seal component to communicate a space inside the exterior container and a space outside the exterior container with each other.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
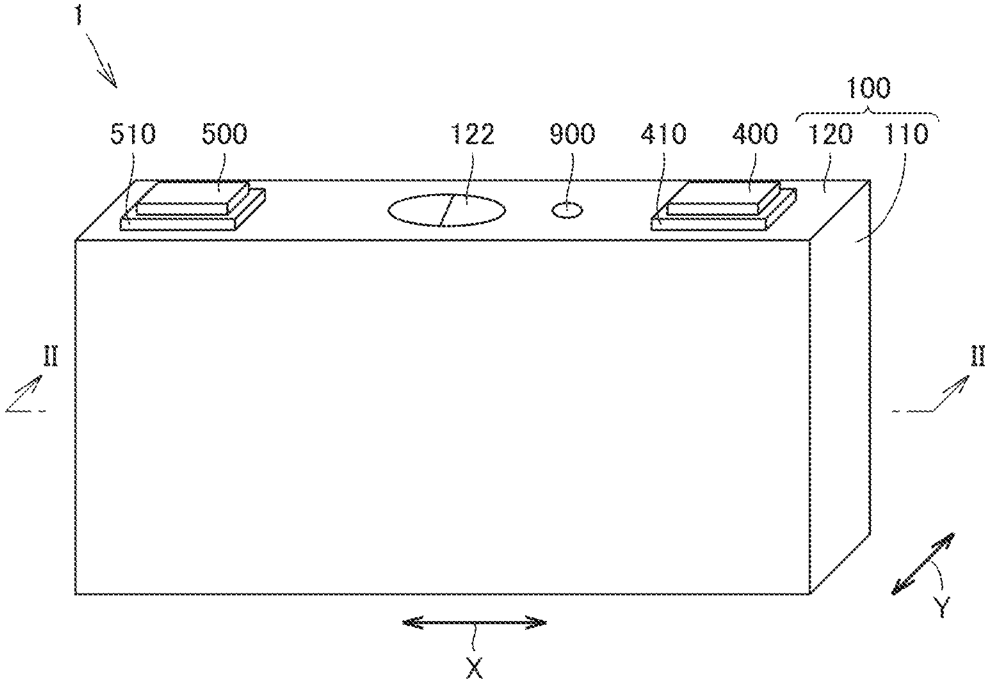
FIG. 1 is a perspective view of a prismatic secondary battery.

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly.

It should be noted that in the present specification, the terms “comprise”, “include”, and “have” are open-end terms. That is, when a certain configuration is included, a configuration other than the foregoing configuration may or may not be included. Further, the present technology is not limited to one that necessarily exhibits all the functions and effects stated in the present embodiment.

In the present specification, the term "battery" is not limited to a lithium ion battery, and may include another battery such as a nickel-metal hydride battery. In the present specification, the term "electrode" may collectively represent a positive electrode and a negative electrode. Further, the term "electrode plate" may collectively represent a positive electrode plate and a negative electrode plate.

Figure 2:
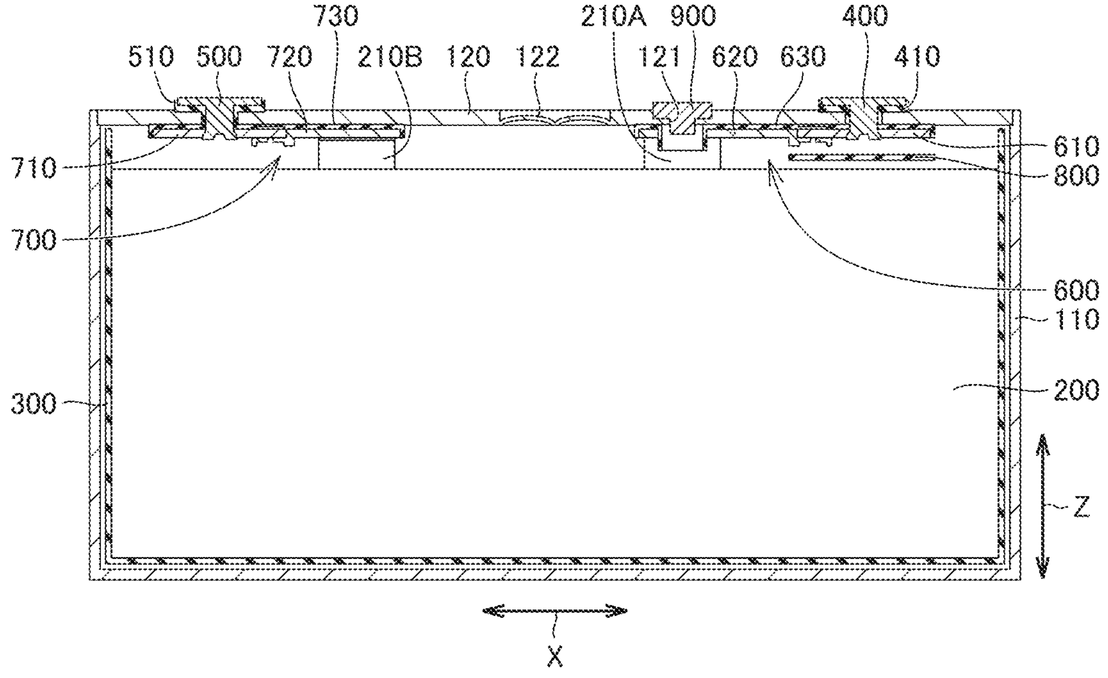
FIG. 2 is a cross sectional view taken along II-II in FIG. 1.

FIG. 1 is a perspective view of a prismatic secondary battery 1. FIG. 2 is a cross sectional view taken along II-II in FIG. 1.

As shown in FIGS. 1 and 2, prismatic secondary battery 1 includes a battery case 100, an electrode assembly 200, an insulating sheet 300, a positive electrode terminal 400, a negative electrode terminal 500, a positive electrode current collecting member 600, a negative electrode current collecting member 700, a cover member 800, and a sealing member 900.

Battery case 100 is constituted of: a prismatic exterior body 110 that is provided with an opening and that has a prismatic tubular shape having a bottom; and a sealing plate 120 that seals the opening of prismatic exterior body 110. Each of prismatic exterior body 110 and sealing plate 120 is preferably composed of a metal, and is preferably composed of aluminum or an aluminum alloy.

Sealing plate 120 is provided with an electrolyte solution injection hole 121. After injecting an electrolyte solution into battery case 100 via electrolyte solution injection hole 121, electrolyte solution injection hole 121 is sealed by a sealing member 900 (rivet).

Sealing plate 120 is provided with a gas discharge valve 122. Gas discharge valve 122 is fractured when pressure in battery case 100 becomes more than or equal to a predetermined value. Thus, gas in battery case 100 is discharged to outside of battery case 100.

Electrode assembly 200 is accommodated in battery case 100 together with the electrolyte solution. Electrode assembly 200 is formed by stacking positive electrode plates and negative electrode plates with separators being interposed therebetween. Insulating sheet 300, which is composed of a resin, is disposed between electrode assembly 200 and prismatic exterior body 110.

A positive electrode tab 210A and a negative electrode tab 210B are provided at an end portion of electrode assembly 200 on the sealing plate 120 side.

Positive electrode tab 210A and positive electrode terminal 400 are electrically connected to each other via positive electrode current collecting member 600. Positive electrode current collecting member 600 includes a first positive electrode current collector 610 and a second positive electrode current collector 620. It should be noted that positive electrode current collecting member 600 may be constituted of one component. Positive electrode current collecting member 600 is preferably composed of a metal, and is more preferably composed of aluminum or an aluminum alloy.

Negative electrode tab 210B and negative electrode terminal 500 are electrically connected to each other via negative electrode current collecting member 700. Negative electrode current collecting member 700 includes a first negative electrode current collector 710 and a second negative electrode current collector 720. It should be noted that negative electrode current collecting member 700 may be constituted of one component. Negative electrode current collecting member 700 is preferably composed of a metal, and is more preferably composed of copper or a copper alloy.

Positive electrode terminal 400 is fixed to sealing plate 120 with an outer side insulating member 410 being interposed therebetween, outer side insulating member 410 being composed of a resin. Negative electrode terminal 500 is fixed to sealing plate 120 with an outer side insulating member 510 being interposed therebetween, outer side insulating member 510 being composed of a resin.

Positive electrode terminal 400 is preferably composed of a metal, and is more preferably composed of aluminum or an aluminum alloy. Negative electrode terminal 500 is preferably composed of a metal, and is more preferably composed of copper or a copper alloy. Negative electrode terminal 500 may have: a region that is composed of copper or a copper alloy and that is disposed on the inner side of battery case 100; and a region that is composed of aluminum or an aluminum alloy and that is disposed on the outer side of battery case 100.

Cover member 800 is located between first positive electrode current collector 610 and electrode assembly 200. Cover member 800 may be provided on the negative electrode current collector side. Further, cover member 800 is not an essential member, and may be omitted as appropriate.

Figure 3:
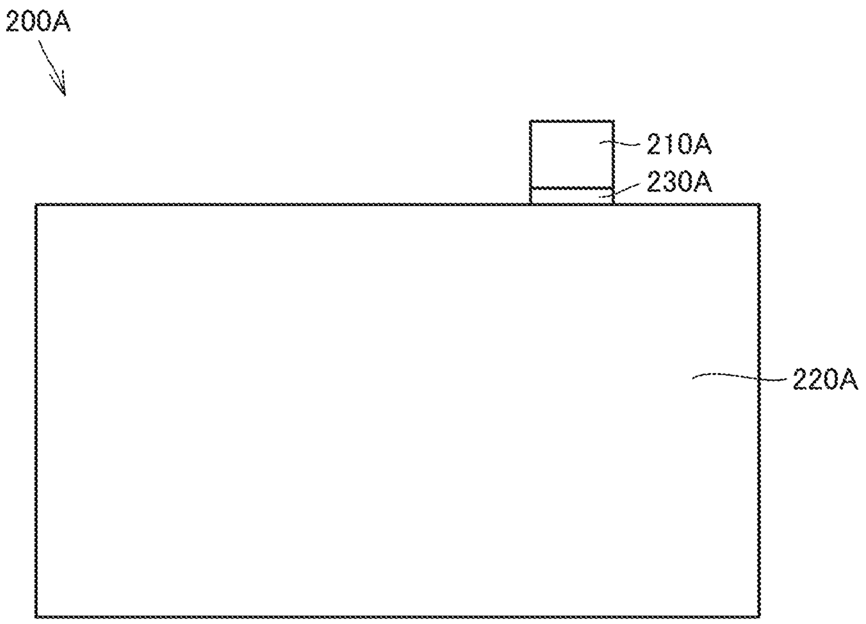
FIG. 3 is a plan view of a positive electrode plate included in an electrode assembly.

FIG. 3 is a plan view of positive electrode plate 200A included in electrode assembly 200. Positive electrode plate 200A has a main body portion 220A in which a positive electrode active material composite layer is formed on each of both surfaces of a positive electrode core body constituted of an aluminum foil having a quadrangular shape, the positive electrode active material composite layer including a positive electrode active material (for example, lithium nickel cobalt manganese composite oxide or the like), a binder (polyvinylidene difluoride (PVdF) or the like), and a conductive material (for example, a carbon material or the like). The positive electrode core body protrudes from an end side of the main body portion, and the positive electrode core body thus protruding constitutes positive electrode tab 210A. A positive electrode protection layer 230A including alumina particles, a binder, and a conductive material is provided on positive electrode tab 210A at a portion adjacent to main body portion 220A Positive electrode protection layer 230A has an electric resistance larger than that of the positive electrode active material composite layer. The positive electrode active material composite layer may include no conductive material. Positive electrode protection layer 230A may not be necessarily provided.

Figure 4:
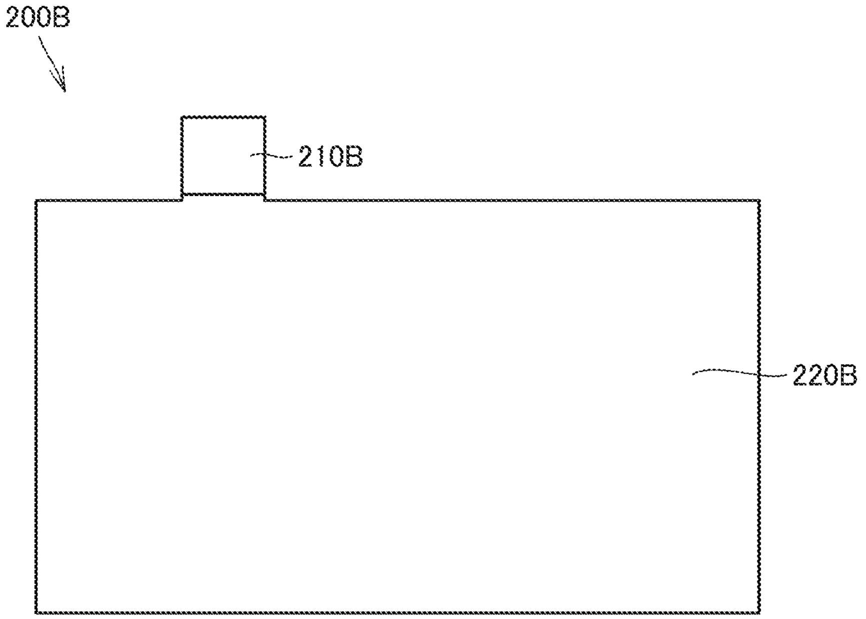
FIG. 4 is a plan view of a negative electrode plate included in the electrode assembly.

FIG. 4 is a plan view of negative electrode plate 200B included in electrode assembly 200. Negative electrode plate 200B has a main body portion 220B in which a negative electrode active material composite layer is formed on each of both surfaces of a negative electrode core body constituted of a copper foil having a quadrangular shape. The negative electrode core body protrudes from an end side of main body portion 220B, and the negative electrode core body thus protruding constitutes negative electrode tab 210B.

Figure 5:
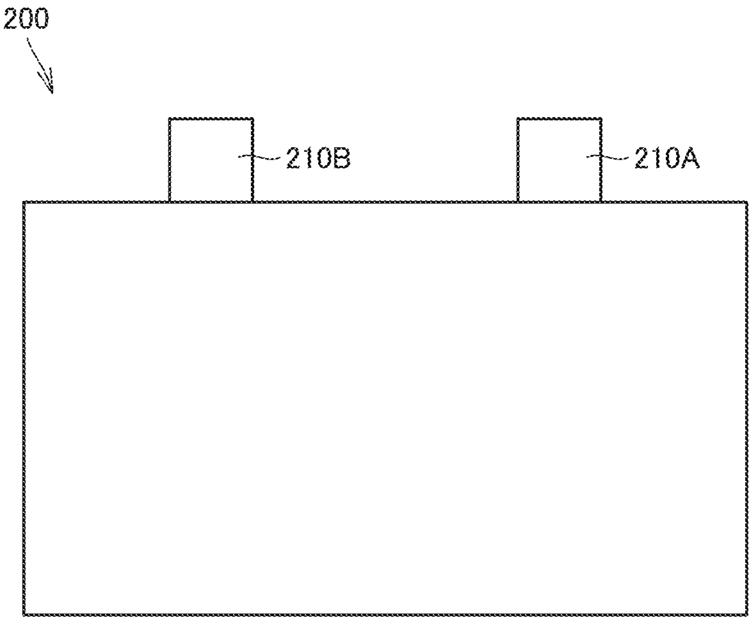
FIG. 5 is a plan view showing the electrode assembly including the positive electrode plate and the negative electrode plate.

FIG. 5 is a plan view showing electrode assembly 200 including positive electrode plates 200A and negative electrode plates 200B. As shown in FIG. 5, electrode assembly 200 is produced such that positive electrode tabs 210A of positive electrode plates 200A are stacked and negative electrode tabs 210B of negative electrode plates 200B are stacked at one end portion of electrode assembly 200. For example, about 50 positive electrode plates 200A and about 50 negative electrode plates 200B are stacked. Positive electrode plates 200A and negative electrode plates 200B are alternately stacked with separators being interposed therebetween, each of the separators being composed of polyolefin, each of the separators having a quadrangular shape. It should be noted that a long separator may be used with the separator being folded in a meandering manner.

Figure 6:
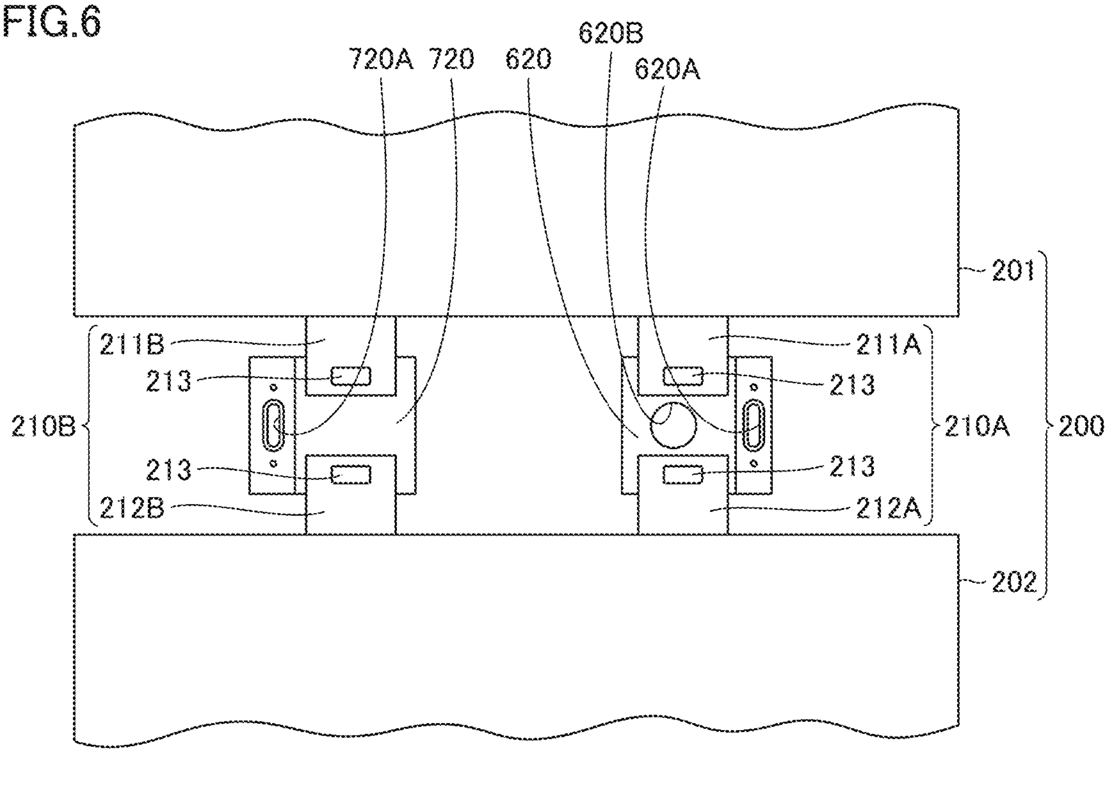
FIG. 6 is a diagram showing a structure of connection between the electrode assembly and each of a positive electrode current collecting member and a negative electrode current collecting member.

FIG. 6 is a diagram showing a structure of connection between electrode assembly 200 and each of positive electrode current collecting member 600 and negative electrode current collecting member 700. As shown in FIG. 6, electrode assembly 200 includes a first electrode assembly element 201 (first stack group) and a second electrode assembly element 202 (second stack group). Separators are also disposed on the respective outer surfaces of first electrode assembly element 201 and second electrode assembly element 202.

The plurality of positive electrode tabs 210A of first electrode assembly element 201 constitute a first positive electrode tab group 211A. The plurality of negative electrode tabs 210B of first electrode assembly element 201 constitute a first negative electrode tab group 211B. The plurality of positive electrode tabs 210A of second electrode assembly element 202 constitute a second positive electrode tab group 212A. The plurality of negative electrode tabs 210B of second electrode assembly element 202 constitute a second negative electrode tab group 212B.

Second positive electrode current collector 620 and second negative electrode current collector 720 are disposed between first electrode assembly element 201 and second electrode assembly element 202. Second positive electrode current collector 620 is provided with a first opening 620A and a second opening 620B. First positive electrode tab group 211A and second positive electrode tab group 212A are connected onto second positive electrode current collector 620 by welding, thereby forming welded connection portions 213. First negative electrode tab group 211B and second negative electrode tab group 212B are connected onto second negative electrode current collector 720 by welding, thereby forming welded connection portions 213. Welded connection portions 213 can be formed by, for example, ultrasonic welding, resistance welding, laser welding, or the like.

Figure 7:
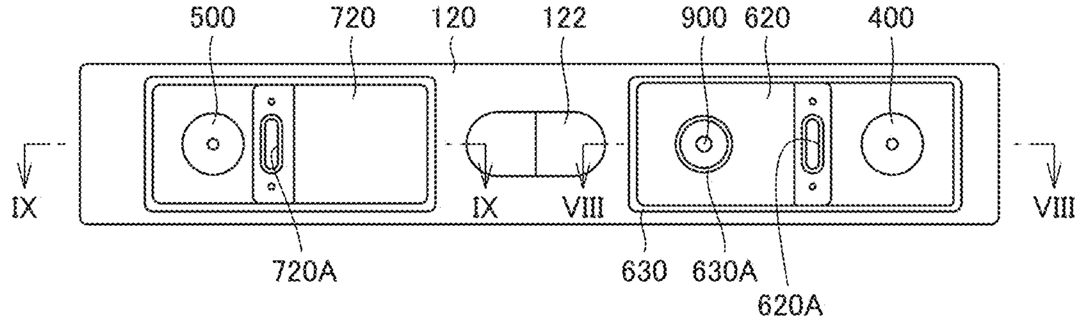
FIG. 7 is a diagram showing a structure of attaching of the positive electrode current collecting member and the negative electrode current collecting member on a sealing plate.
Figure 8:
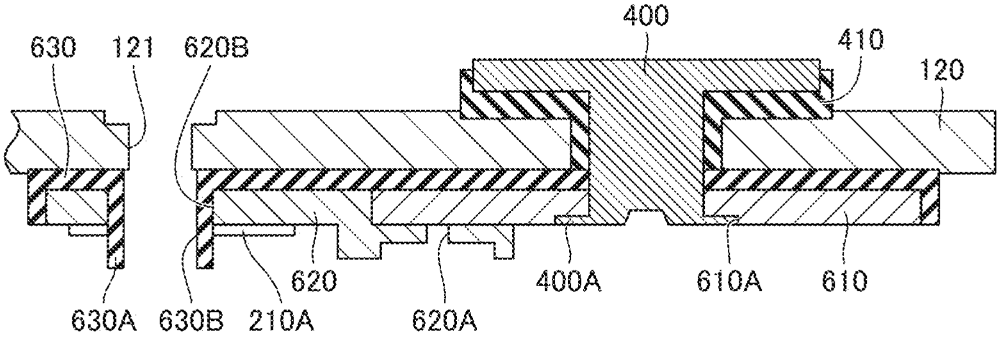
FIG. 8 is a cross sectional view taken along VIII-VIII in FIG. 7.
Figure 9:
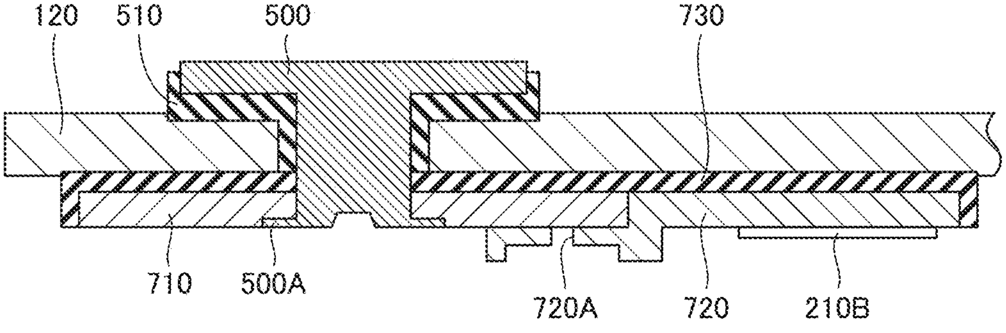
FIG. 9 is a cross sectional view taken along IX-IX in FIG. 7.

FIG. 7 is a diagram showing a structure of attaching of positive electrode current collecting member 600 and negative electrode current collecting member 700 on sealing plate 120. FIG. 8 shows a cross section taken along VIII-VIII in FIG. 7. FIG. 9 shows a cross section taken along IX-IX in FIG. 7.

First, the following describes attaching of positive electrode current collecting member 600 on sealing plate 120 with reference to FIGS. 7 and 8.

Outer side insulating member 410 composed of a resin is disposed on the outer surface side of sealing plate 120. First positive electrode current collector 610 and insulating member 630 (positive electrode current collector holder) composed of a resin are disposed on the inner surface side of sealing plate 120. Next, positive electrode terminal 400 is inserted into a through hole of outer side insulating member 410, a positive electrode terminal attachment hole of sealing plate 120, a through hole of first positive electrode current collector 610, and a through hole of insulating member 630. A swaged portion 400A located at the tip of positive electrode terminal 400 is connected onto first positive electrode current collector 610 by swaging. Thus, positive electrode terminal 400, outer side insulating member 410, sealing plate 120, first positive electrode current collector 610, and insulating member 630 are fixed. It should be noted that the portions of positive electrode terminal 400 and first positive electrode current collector 610 connected to each other by the swaging are preferably welded by laser welding or the like. It should be noted that first positive electrode current collector 610 is provided with a countersunk hole 610A, and swaged portion 400A is provided in countersunk hole 610A.

Further, second positive electrode current collector 620 is disposed on insulating member 630 such that a portion of second positive electrode current collector 620 overlaps with first positive electrode current collector 610. In first opening 620A provided in second positive electrode current collector 620, second positive electrode current collector 620 is welded to first positive electrode current collector 610 by laser welding or the like.

As shown in FIG. 8, insulating member 630 has a tubular portion 630A that protrudes on the electrode assembly 200 side. Tubular portion 630A extends through second opening 620B of second positive electrode current collector 620 and defines a hole portion 630B that communicates with electrolyte solution injection hole 121.

When attaching positive electrode current collecting member 600 on sealing plate 120, first positive electrode current collector 610 is first connected to insulating member 630 on sealing plate 120. Then, second positive electrode current collector 620 connected to electrode assembly 200 is attached to first positive electrode current collector 610. On this occasion, second positive electrode current collector 620 is disposed on insulating member 630 such that a portion of second positive electrode current collector 620 overlaps with first positive electrode current collector 610. Then, the circumference around first opening 620A provided in second positive electrode current collector 620 is welded to first positive electrode current collector 610 by laser welding or the like.

Next, the following describes attaching of negative electrode current collecting member 700 on sealing plate 120 with reference to FIGS. 7 and 9.

Outer side insulating member 510 composed of a resin is disposed on the outer surface side of sealing plate 120. First negative electrode current collector 710 and insulating member 730 (negative electrode current collector holder) composed of a resin are disposed on the inner surface side of sealing plate 120. Next, negative electrode terminal 500 is inserted into a through hole of outer side insulating member 510, a negative electrode terminal attachment hole of sealing plate 120, a through hole of first negative electrode current collector 710, and a through hole of insulating member 730. A swaged portion 500A located at the tip of negative electrode terminal 500 is connected onto first negative electrode current collector 710 by swaging. Thus, negative electrode terminal 500, outer side insulating member 510, sealing plate 120, first negative electrode current collector 710, and insulating member 730 are fixed. It should be noted that the portions of negative electrode terminal 500 and first negative electrode current collector 710 connected to each other by the swaging are preferably welded by laser welding or the like.

Further, second negative electrode current collector 720 is disposed on insulating member 730 such that a portion of second negative electrode current collector 720 overlaps with first negative electrode current collector 710. In first opening 720A provided in second negative electrode current collector 720, second negative electrode current collector 720 is welded to first negative electrode current collector 710 by laser welding or the like.

When attaching negative electrode current collecting member 700 on sealing plate 120, first negative electrode current collector 710 is first connected to insulating member 730 on sealing plate 120. Then, second negative electrode current collector 720 connected to electrode assembly 200 is attached to first negative electrode current collector 710. On this occasion, second negative electrode current collector 720 is disposed on insulating member 730 such that a portion of second negative electrode current collector 720 overlaps with first negative electrode current collector 710. Then, the circumference around first opening 720A provided in second negative electrode current collector 720 is welded to first negative electrode current collector 710 by laser welding or the like.

Figure 10:
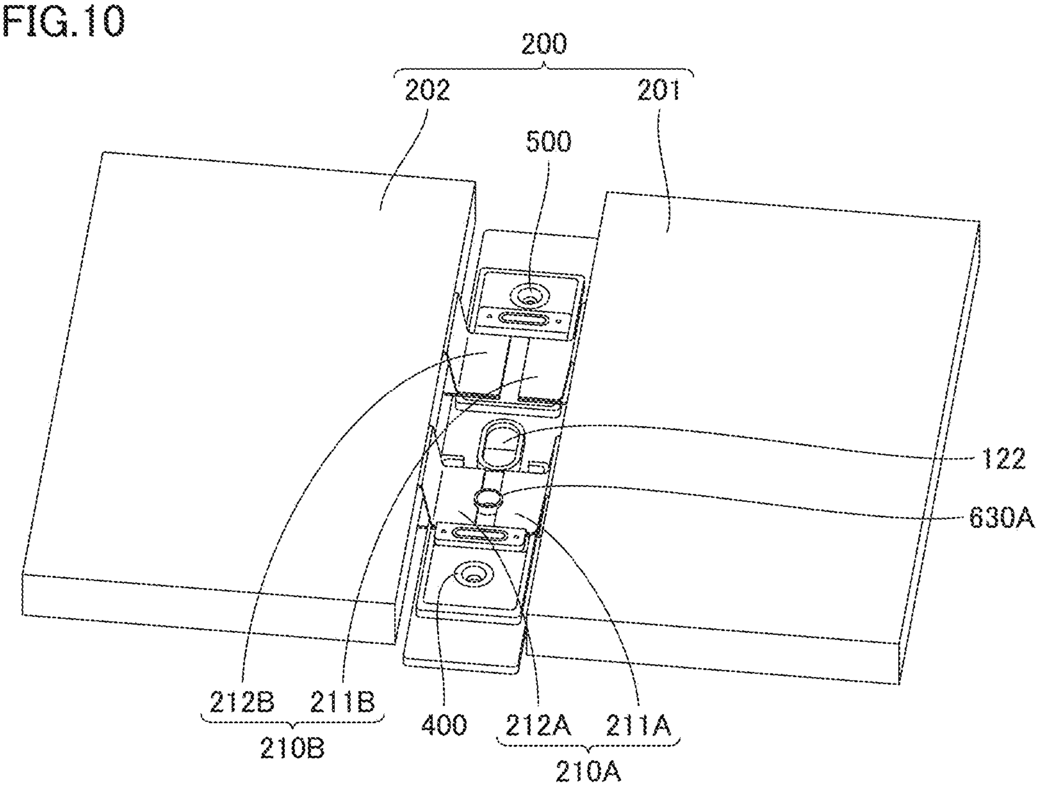
FIG. 10 is a diagram showing a state in which the sealing plate and the electrode assembly are connected to each other.

FIG. 10 is a diagram showing a state in which sealing plate 120 and electrode assembly 200 are connected to each other. As described above, first electrode assembly element 201 and second electrode assembly element 202 are attached to sealing plate 120 with positive electrode current collecting member 600 and negative electrode current collecting member 700 being interposed therebetween. Thus, as shown in FIG. 10, first electrode assembly element 201 and second electrode assembly element 202 are connected to sealing plate 120, thereby electrically connecting electrode assembly 200 to positive electrode terminal 400 and negative electrode terminal 500.

From the state shown in FIG. 10, first electrode assembly element 201 and second electrode assembly element 202 are stacked on each other. On this occasion, first positive electrode tab group 211A and second positive electrode tab group 212A are curved in different directions. First negative electrode tab group 211B and second negative electrode tab group 212B are curved in different directions.

First electrode assembly element 201 and second electrode assembly element 202 can be stacked on each other by a tape or the like. Alternatively, first electrode assembly element 201 and second electrode assembly element 202 can be stacked on each other by placing them in an insulating sheet formed in the form of a box or a pouch. Further, first electrode assembly element 201 and second electrode assembly element 202 can be fixed by adhesion.

First electrode assembly element 201 and second electrode assembly element 202 stacked on each other are enclosed with insulating sheet 300 and are inserted into prismatic exterior body 110. Thereafter, sealing plate 120 is welded to prismatic exterior body 110 to seal the opening of prismatic exterior body 110 by sealing plate 120, thereby forming sealed battery case 100.

Thereafter, a nonaqueous electrolyte is injected into battery case 100 through electrolyte solution injection hole 121 provided in sealing plate 120. Examples of the nonaqueous electrolyte solution usable herein include a nonaqueous electrolyte solution including ethylene carbonate (EC), ethyl methyl carbonate (EMC), diethyl carbonate (DEC), and dimethyl carbonate (DMC).

After injecting the nonaqueous electrolyte solution, a decompression step in battery case 100 is performed, and then electrolyte solution injection hole 121 is sealed by sealing member 900. By performing the above steps, prismatic secondary battery 1 is completed.

Figure 11:
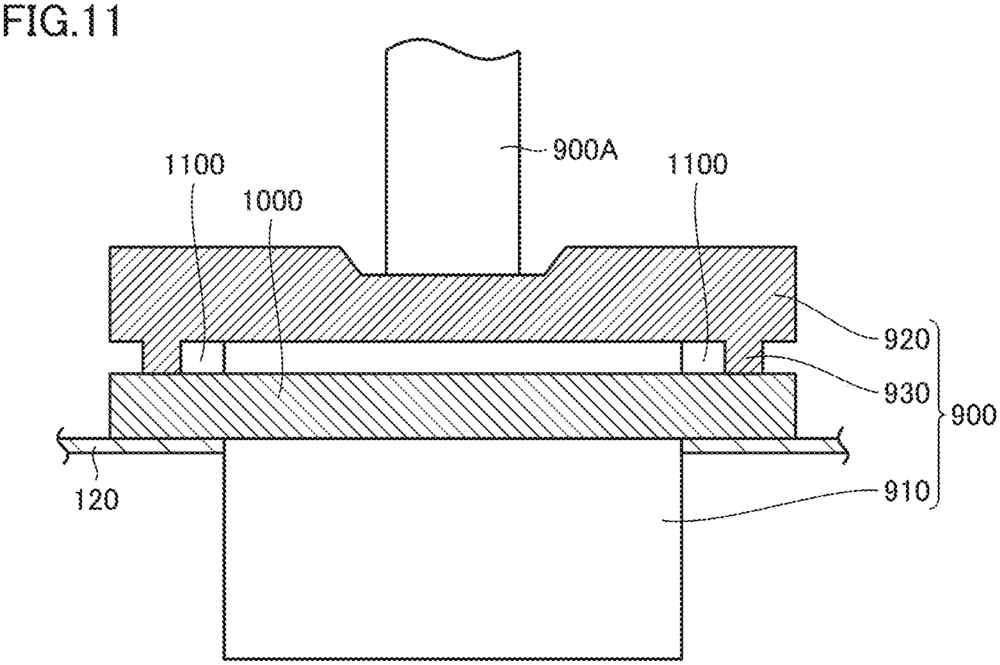
FIG. 11 is a diagram showing a state before the sealing member is fixed to the exterior container by swaging.
Figure 12:
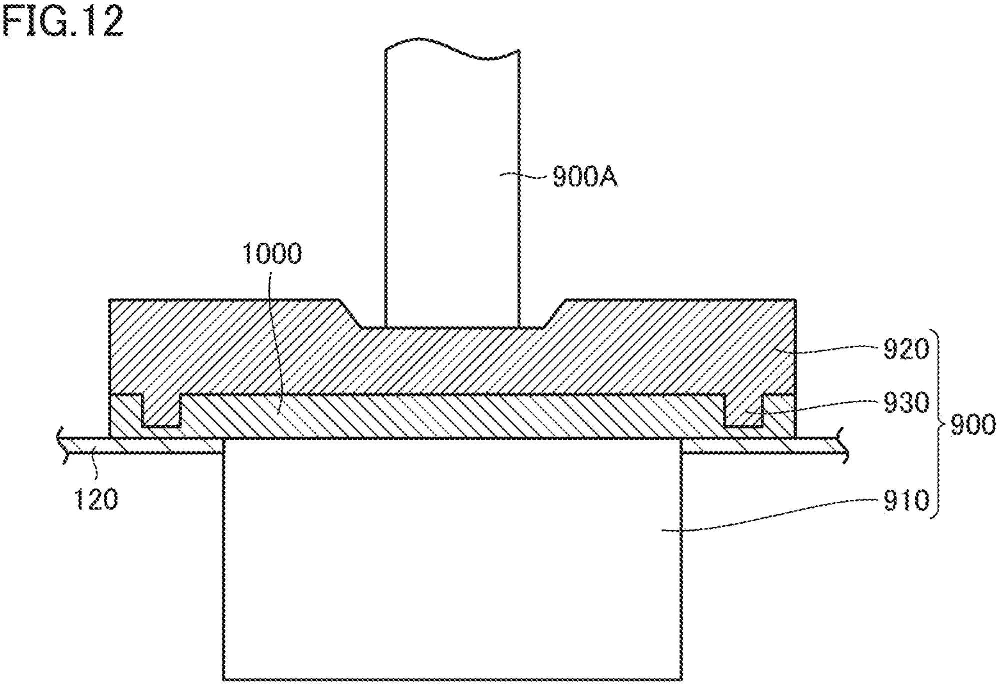
FIG. 12 is a diagram showing a state in which the sealing member is fixed to the exterior container by swaging.
Figure 13:
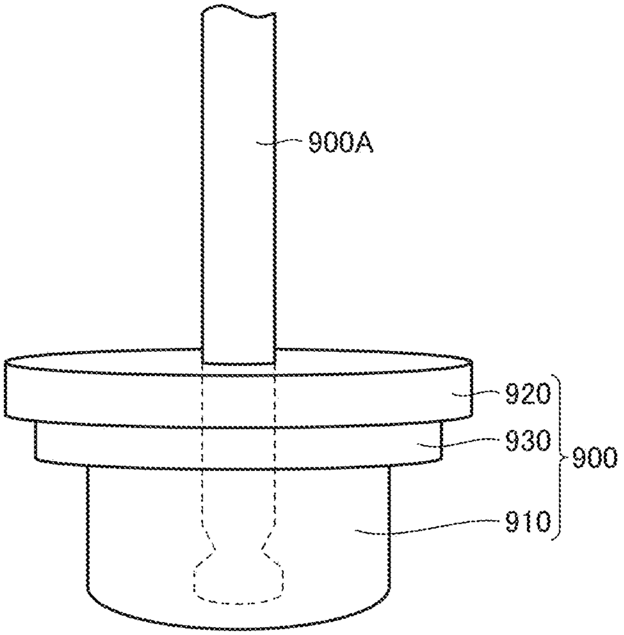
FIG. 13 is a diagram showing the sealing member to be fixed by swaging.

FIG. 11 is a diagram showing a state before sealing member 900 is fixed to sealing plate 120 of battery case 100 by swaging, and FIG. 12 is a diagram showing a state in which sealing member 900 is fixed to sealing plate 120 by swaging. FIG. 13 is a diagram showing sealing member 900 to be fixed by swaging.

As shown in FIGS. 11 to 13, sealing member 900 includes a mandrel portion 900A, a stem portion 910, a flange portion 920, and a rib 930 (protrusion).

Stem portion 910 is inserted into electrolyte solution injection hole 121 and is fixed to sealing plate 120 by swaging. Flange portion 920 is located outside sealing plate 120 and is located on the outer side with respect to stem portion 910 in the radial direction of stem portion 910. Rib 930 is formed to have an annular shape and protrudes from flange portion 920 to the sealing plate 120 side. Rib 930 may be formed to have a substantially annular shape with a portion including a discontinuous portion.

Mandrel portion 900A is composed of a metal material such as an aluminum alloy (A3003). Each of stem portion 910, flange portion 920, and rib 930 is composed of a metal material such as stainless steel (SUS430).

As shown in FIGS. 11 and 12, a washer 1000 (seal component) is provided between flange portion 920 of sealing member 900 and sealing plate 120. Washer 1000 is composed of a material softer than the material of rib 930 of sealing member 900. Washer 1000 is composed of a resin material such as PFA (perfluoroalkoxy alkane) or PP (polypropylene).

As shown in FIG. 11, in the state before sealing member 900 is fixed to sealing plate 120 of battery case 100 by swaging, the tip of rib 930 and washer 1000 are brought into abutment with each other. In the state in which stem portion 910 of sealing member 900 is fixed to sealing plate 120 by swaging, rib 930 is embedded in washer 1000 as shown in FIG. 12. In this state, flange portion 920 of sealing member 900 is in close contact with washer 1000, and washer 1000 is in close contact with sealing plate 120. Thus, prismatic exterior body 110 is sealed, thereby preventing leakage of the electrolyte solution in prismatic exterior body 110.

In the state shown in FIG. 11, the electrolyte solution (mainly, the electrolyte solution suctioned during the decompression step) may be present in a space 1100 surrounded by stem portion 910, flange portion 920, and rib 930 of sealing member 900 and washer 1000. On this occasion, the electrolyte solution is not compressed even when sealing member 900 is pushed in, so that rib 930 of sealing member 900 is not sufficiently embedded in washer 1000 unless an appropriate countermeasure is taken to eject the electrolyte solution, thus presumably resulting in a state in which stem portion 910 of sealing member 900 is fixed to sealing plate 120 by swaging with prismatic exterior body 110 being insufficiently sealed (in the present specification, this state may be referred to as "insufficient swaging").

In prismatic secondary battery 1 according to the present embodiment, occurrence of the insufficient swaging is suppressed by providing communication paths 940, 1010 described later.

Figure 14:
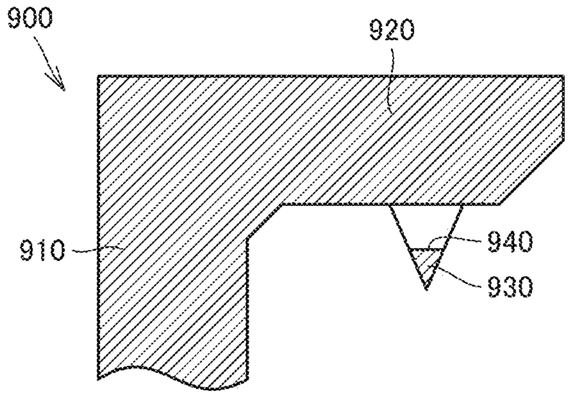
FIG. 14 is a cross sectional view of the sealing member.

FIG. 14 is a cross sectional view of sealing member 900. As shown in FIG. 14, communication path 940 is formed in rib 930 of sealing member 900. In the state before sealing member 900 is fixed to sealing plate 120 by swaging, when rib 930 of sealing member 900 and washer 1000 are brought into abutment with each other, communication path 940 communicates a space inside battery case 100 and a space outside battery case 100 with each other.

With the formation of communication path 940 that communicates the space inside battery case 100 and the space outside battery case 100 with each other, an ejection path is formed to allow the electrolyte solution remaining between flange portion 920 of sealing member 900 and the upper surface of sealing plate 120 to be ejected to outside when fixing sealing member 900 by swaging, thereby suppressing the occurrence of the insufficient swaging.

In the state in which sealing member 900 is fixed by swaging, rib 930 is embedded in washer 1000, so that communication path 940 is closed. However, by removing sealing member 900 fixed by swaging and washer 1000 from sealing plate 120 and disassembling them, presence of communication path 940 before the fixation by swaging can be confirmed.

Next, an exemplary communication path 940 will be described with reference to FIGS. 15 to 19.

In each of examples of FIGS. 15 to 18, communication path 940 is constituted of through holes extending in the radial direction of rib 930. Each of the through holes is formed in a portion of rib 930 that is located in the protruding direction of rib 930 and that is located on the root side of rib 930.

When fixing sealing member 900 by swaging, sealing member 900 is embedded in washer 1000 from the tip side of rib 930. By forming the through hole on the root side of rib 930, the ejecting path for the electrolyte solution can be stably secured until immediately before completion of the fixing by swaging.

Figure 15:
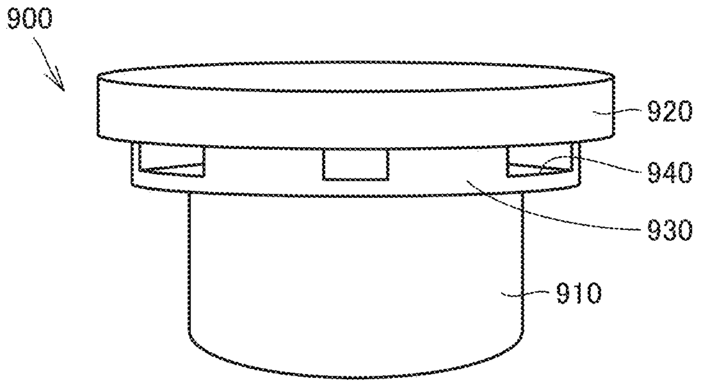
FIGS. 15 to 19 are perspective views each showing an exemplary sealing member.
Figure 16:
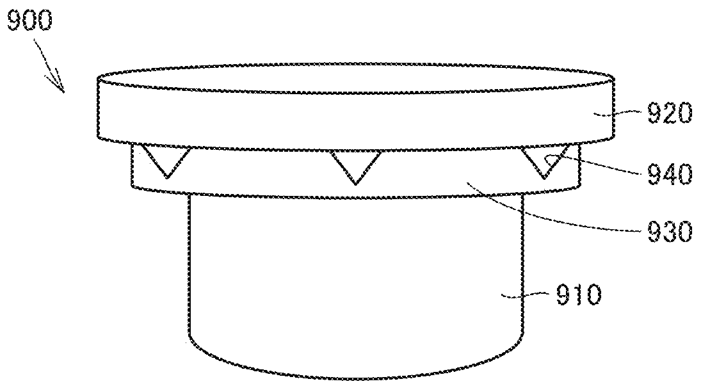
Figure 17:
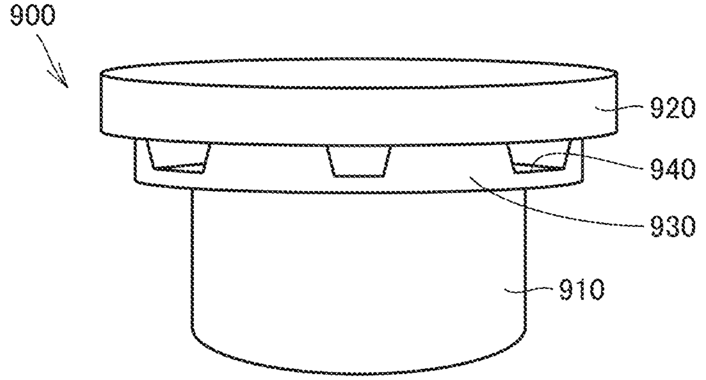
Figure 18:
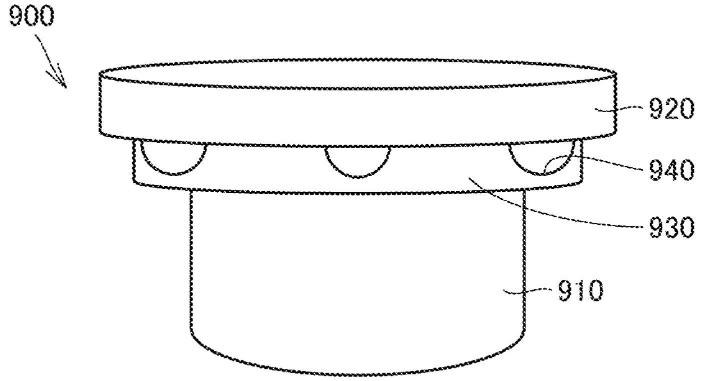

The through hole may have a substantially quadrangular cross sectional shape as shown in FIG. 15, may have a substantially triangular cross sectional shape as shown in FIG. 16, may have a substantially trapezoidal cross sectional shape as shown in FIG. 17, or may have a substantially semicircular cross sectional shape as shown in FIG. 18.

In order to stably secure the ejection path for the electrolyte solution until immediately before the completion of the fixing by swaging, the cross sectional shape of communication path 940 is preferably wider on the root side of rib 930 than on the tip side of rib 930 as shown in FIGS. 16 to 18.

Figure 19:
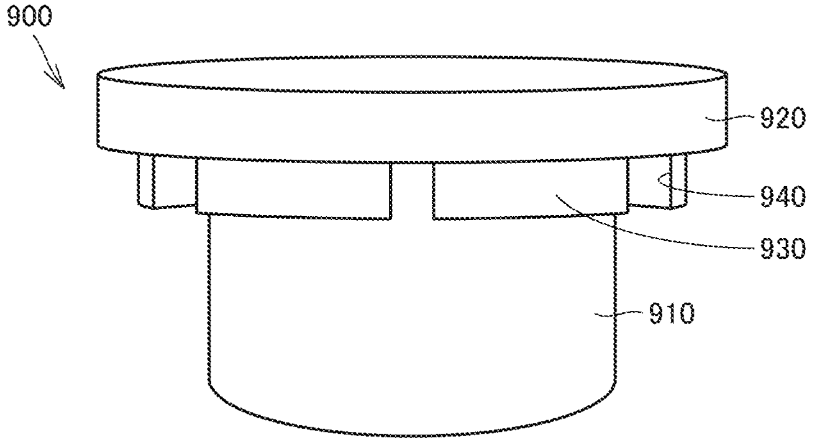

In the example of FIG. 19, communication path 940 is constituted of cutout portions each formed in a portion of rib 930 in the peripheral direction of rib 930. Also with communication path 940 shown in FIG. 19, the ejection path for the electrolyte solution can be stably secured until immediately before the completion of the fixing by swaging.

Figure 20:
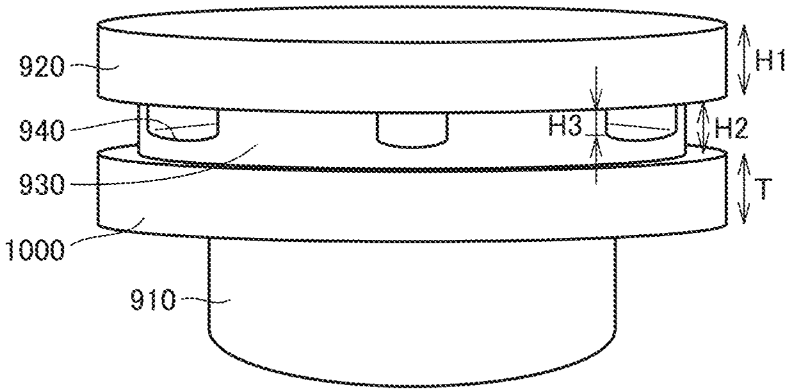
FIG. 20 is a diagram showing the sealing member and a washer before the fixation by swaging.

FIG. 20 is a diagram showing sealing member 900 and washer 1000 before the fixation by swaging. As an example, the height (H1) of flange portion 920 of sealing member 900 is about 0.9 mm, the height (H2) of rib 930 is about 0.2 mm (H2<H1), and the thickness (T) of washer 1000 is about 0.4 mm (T>H2).

The height (H3) of communication path 940 is preferably as high as possible within the range of the height (H2) of rib 930, and is preferably about 50% or more of the height (H2) of rib 930.

As an example, the cross sectional area of communication path 940 is about 5% or more and 10% or less of the product of the peripheral length of the outermost periphery of rib 930 and the height (H2) of rib 930.

By setting the height and the cross sectional area of communication path 940 to fall within the predetermined ranges, the ejection path for the electrolyte solution during the fixation by swaging can be stably secured.

Figure 21:
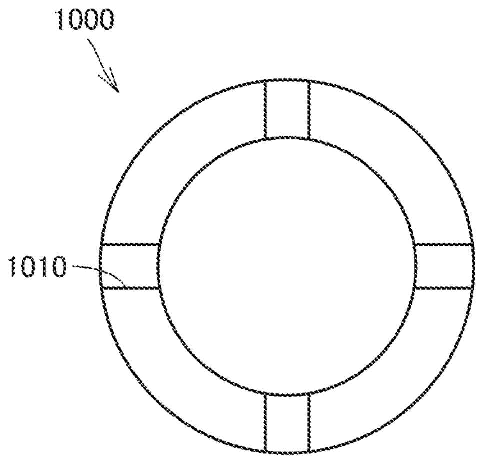
FIG. 21 is a top view showing an exemplary washer.
Figure 22:
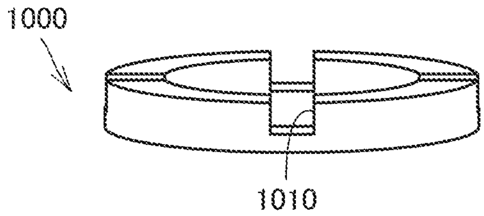
FIG. 22 is a perspective view showing the exemplary washer.

FIGS. 21 and 22 are diagrams each showing an exemplary washer 1000. FIG. 21 is a top view of washer 1000, and FIG. 22 is a perspective view of washer 1000.

As shown in FIGS. 21 and 22, communication path 1010 is formed which is constituted of a recess obtained by reducing the thickness of a portion of washer 1000 in the peripheral direction of washer 1000. When rib 930 of sealing member 900 and washer 1000 are brought into abutment with each other in the state before sealing member 900 is fixed to sealing plate 120 by swaging, communication path 1010 communicates the space inside battery case 100 and the space outside battery case 100 with each other. Also with communication path 1010 formed in washer 1000, the same effect can be exhibited as the effect exhibited by communication path 940 formed in sealing member 900.

Although the embodiments of the present invention has been described and illustrated in detail, it is clearly understood that the same is by way of illustration and example only and is not to be taken by way of limitation, the scope of the present invention being interpreted by the terms of the appended claims.

What is claimed is:

1. A battery, comprising:
- an electrode assembly and an electrolyte solution;
- an exterior container that accommodates the electrode assembly and the electrolyte solution and that is provided with an injection hole for the electrolyte solution;
- a sealing member that is fixed to the exterior container and that seals the injection hole; and
- a seal component that has an annular shape and that is located between a first outer surface of the exterior container and the sealing member, wherein
- the sealing member includes:
  - a stem portion inserted into the injection hole,
  - a flange portion that is located outside the exterior container and that is located on an outer side with respect to the stem portion in a radial direction of the stem portion, and
  - a protrusion that has a substantially annular shape and that protrudes from the flange portion toward the exterior container,
- the protrusion has a root side, and a tip side opposite to the root side in a protruding direction of the protrusion,
- a through hole is formed in a portion of the protrusion that is located on the root side of the protrusion, the through hole extending from an inner circumference of the protrusion to an outer circumference of the protrusion,
- the sealing member is fixed to the exterior container, and at least the tip side of the protrusion is embedded in the seal component so that the through hole is closed, and
- the first outer surface of the exterior container is flat in a whole region in which the first outer surface faces the flange portion.

2. The battery according to claim 1, wherein a cross sectional area of the through hole is 5% or more and 10% or less of a product of a peripheral length of an outermost periphery of the protrusion and a height of the protrusion.

3. A battery, comprising:
- an electrode assembly and an electrolyte solution;
- an exterior container that accommodates the electrode assembly and the electrolyte solution and that is provided with an injection hole for the electrolyte solution;
- a sealing member that is fixed to the exterior container and that seals the injection hole; and
- a seal component that has an annular shape and that is located between a first outer surface of the exterior container and the sealing member, wherein
- the sealing member includes:
  - a stem portion inserted into the injection hole,
  - a flange portion that is located outside the exterior container and that is located on an outer side with respect to the stem portion in a radial direction of the stem portion, and
  - a protrusion that has a substantially annular shape and that protrudes from the flange portion toward the exterior container,
- the protrusion has a root side, and a tip side opposite to the root side in a protruding direction of the protrusion,
- a cutout portion is formed in a portion of the protrusion that is located in a peripheral direction of the protrusion, the cutout portion extending from an inner circumference of the protrusion to an outer circumference of the protrusion, the sealing member is fixed to the exterior container, and at least the tip side of the protrusion is embedded in the seal component so that the cutout portion is closed, and the first outer surface of the exterior container is flat in a whole region in which the first outer surface faces the flange portion.

4. A battery, comprising:

an electrode assembly and an electrolyte solution;

an exterior container that accommodates the electrode assembly and the electrolyte solution and that is provided with an injection hole for the electrolyte solution;

a sealing member that is fixed to the exterior container and that seals the injection hole; and a seal component that has an annular shape and that is located between a first outer surface of the exterior container and the sealing member, wherein the sealing member includes:

a stem portion inserted into the injection hole, a flange portion that is located outside the exterior container and that is located on an outer side with respect to the stem portion in a radial direction of the stem portion, and a protrusion that has a substantially annular shape and that protrudes from the flange portion toward the exterior container, the protrusion has a root side, and a tip side opposite to the root side in a protruding direction of the protrusion, a recess is formed in the seal component at a portion where a thickness of the seal component is reduced in a peripheral direction of the seal component, the recess extending from an inner circumference of the seal component to an outer circumference of the seal component, the sealing member is fixed to the exterior container, and at least the tip side of the protrusion is embedded in the seal component so that the recess is closed, and the first outer surface of the exterior container is flat in a whole region in which the first outer surface faces the flange portion.

* * * * *